United States Patent [19]
Reinhart

[11] 3,917,929
[45] Nov. 4, 1975

[54] SYSTEMS AND METHODS FOR SOLVING SIMULTANEOUS EQUATION

[75] Inventor: Tom R. Reinhart, Sugar Land, Tex.

[73] Assignee: Baylor Company, Sugar Land, Tex.

[22] Filed: Nov. 19, 1973

[21] Appl. No.: 416,975

[52] U.S. Cl. ............ 235/150.2; 235/180; 318/588; 114/144 B; 235/185; 318/55
[51] Int. Cl. .................. B63h 25/04; B63h 25/42
[58] Field of Search ....... 318/588; 235/150.27, 180, 235/185; 114/144 B; 244/76 J, 1 SA

[56] References Cited
UNITED STATES PATENTS

| | | | |
|---|---|---|---|
| 2,525,124 | 10/1950 | Gallaway et al. | 235/180 |
| 2,981,473 | 4/1961 | Goto | 235/180 X |
| 3,481,299 | 12/1969 | Horn | 114/144 B |
| 3,508,512 | 4/1970 | Desrayaud et al. | 318/588 X |
| 3,730,126 | 5/1973 | Zunderdorp | 114/144 B |

Primary Examiner—Eugene G. Botz
Attorney, Agent, or Firm—Hubbard, Thurman, Turner & Tucker

[57] ABSTRACT

An electrical model of a plurality of simultaneous equations, such as equations representing a dynamic propulsion system, is disclosed as including a plurality of transformers generally greater in number than the number of equations to be solved. Each transformer includes a plurality of windings with a separate winding of each transformer provided for each different variable of the simultaneous equations. The windings of the respective transformers representing the same variable of the equations are coupled together to form a group of such windings representing one of the simultaneous equations. Electrical signals having values representing invariant conditions to be solved by the equations are coupled to the appropriate group of windings and output signals are induced in output windings of the transformers which are a function of the input voltage applied.

A specific example of a dynamic propulsion system represented by such equations is a thruster control system for controlling a plurality of thrusters propelling or positioning a floating vessel, which as an offshore drilling vessel. In this example, the simultaneous equations to be solved are those representing the available degrees of freedom of the thrusters and internal constraints designed to optimize thruster operations.

34 Claims, 6 Drawing Figures

SYSTEMS AND METHODS FOR SOLVING SIMULTANEOUS EQUATION

BACKGROUND AND SUMMARY OF THE INVENTION

This invention relates to apparatus and methods for solving a plurality of simultaneous equations representing the response of a dynamic system to a plurality of conditions, and in one of its aspects to a thruster control system including such apparatus and utilizing such methods to control the motions of a marine vessel.

Simultaneous equations can be written in many cases representing the simultaneous application of a plurality of invariant conditions or commands to a dynamic system including a plurality of active devices adapted to respond to the commands to provide one or more control functions. In such a system, each active device provides a component part of the whole response of the system, and because of the inter-related nature of this response, solution of these equations can be a difficult and tedious task. In the past, either highly skilled operators who could compute or predict accurately the controlled response of the system to a plurality of commands, or sophisticated and expensive computers, were required in order to simultaneously solve the control equations. However, it is desirable that some control apparatus be provided to predict or control the composite effect of the control functions on the active devices during any set of command conditions, which apparatus is relatively simple and inexpensive, adapted to different types of control situations, and automatically provides the required control without intervention of highly skilled operators.

Such is provided by the present invention by providing an electrical analog or model which automatically responds to a plurality of electrical signals representing the command functions to provide appropriate control signals to the active devices in accordance with the proper solution of the simultaneous equations written to describe the relationship.

A prime example of the application of this electrical model is in the control of a dynamic propulsion system such as a plurality of thrusters used to propel and control the motion of a vessel, vehicle or other craft in those directions that the vessel, vehicle or craft is free to move in response to thrust.

For the vessel or vehicle itself there are well defined degrees of freedom of motion as follows:

1. For anything constrained not to move in any manner there are zero degrees of freedom, for it cannot move.
2. For a railroad train there is only one degree of freedom; either to go or not to go (backwards is just the negative of forward).
3. For an automobile driven slowly (so as not to slide) over a smooth road there are only the two degrees of freedom of moving; ahead and turning.
4. For a ship with thrusters on a smooth sea there are three degrees of freedom; forward, sideways and turning (surge, sway and yaw).
5. For a ship on a rough sea, a spacecraft, or aircraft, there are the full six degrees of freedom of a rigid free body as follows:
    a. Surge (forward - reverse).
    b. Sway (side to side).
    c. Heave (up and down).
    d. Pitch (turning about a port-starboard axis).
    e. Roll (turning about a fore-aft axis).
    f. Yaw (turning about a vertical axis).

An equation can be written for each degree of freedom involved in a particular vessel or vehicle and proper control of the vessel through the range of control functions requires simultaneous solution of these equations.

Typically, for a ship or barge, control is exercised only for the two motions of surge and the directional motion of yaw to make two degrees of freedom just as in an automobile. For a ship with thrusters, another degree of freedom of sway or sidewise controlled motion is added. If the sea becomes rough, however, the three degrees of freedom previously neglected become significant as they cause the vessel to pitch, roll and heave. In some cases, these motions of pitch, roll, and heave may be also subjected to attempts of control. They are controlled in a spacecraft, but they are usually not controlled in a ship.

For thrusters used in a vessel such as a semi-submersible offshore drilling vessel, it has one degree of freedom if it is fixed, and two degrees of freedom if it is a steerable or azimuthing thruster. Since for a ship (with thrusters) only 3° of freedom are being controlled, additional thrusters beyond the three fixed thruster minimum result in redundant degrees of freedom. For example, a practical arrangement of four steerable thrusters results in eight degrees of thruster freedom which is five degrees of freedom more than the minimum three required for dynamic positioning of a vessel on the ocean surface. The latter degrees of freedom can be represented by the sum of the component forces of the thrusters in the respective direction of the degree of freedom. However, as explained herein, the five degrees of freedom not used may be utilized by internal constraints which may be designed to optimize system performances. The constraints may have very desirable qualities or may be merely the avoidance of undesirable qualities such as follows:

1. Controlling thruster bias (thrust components in opposite directions) either to eliminate or to set bias to a chosen value.
2. Performing momenting with most favorably disposed thrusters.
3. Controlling method of thrust application for maximum fuel economy.
4. Controlling method of thrust application for maximum utilization of installed horsepower.
5. Improving system linearity by minimizing propeller shaft reversals or azimuthing thruster direction reversing.
6. Allocation of commands according to thruster horsepower so that, for example, a unit of 500 horsepower is loaded to the same percent of horsepower rating power when teamed with a unit of 2,000 horsepower and so that both come to full load at the same time.

The above partial list shows some of the advantages that may be provided by careful use of surplus thruster degrees of freedom. To achieve use of these extra degrees of freedom specific conditions are imposed on the thruster set. By solving the simultaneous equations representing the three basic degrees of freedom as modified by the imposed internal constraints, desired control of the plurality of thrusters controlling the vessel can be provided.

It is thus an object of this invention to provide an electrical model of a plurality of simultaneous equations representing the imposition of a plurality of invariant input conditions on a dynamic system so that the response of various components of the system is automatically computed and control signals for the system are automatically provided in accordance with the solution of the simultaneous equations during changing input conditions.

Another object of this invention is to provide such an electrical model that can be readily modified to simulate changes in the system to which the simultaneous equations relate.

Another object of the invention is to provide such an electrical model which can be readily programmed to provide a desired response of the system components when pre-selected conditions occur so that, for example, a turning command for a plurality of thrusters controlling the motion of a vessel will result in response by the most favorably disposed thrusters.

Another object of this invention is to provide such an electrical model that has particular application in a thruster control system for controlling a plurality of thrusters controlling a vessel, vehicle, or craft, and to provide such a thruster control system utilizing the present invention.

These and other objects, advantages, and features of this invention, which will be apparent upon consideration of the appended claims and drawings, and the detailed description herein of the drawings, are accomplished by providing an electrical model including a signal generating means for generating a plurality of electrical signals each representing an invariant condition to be imposed on a dynamic system, and circuit means including a plurality of signal responsive means, such as separate windings in multiwinding transformers arranged in a plurality of first groups of said signal responsive means connected together so that each such first group represents one of a plurality of simultaneous equations to be solved. Each of the electrical signals generated is conducted to one of said first groups, and the plurality of signal responsive means are also arranged in second groups of such means for combining component parts of these electrical signals to represent response to various conditions by a component of the system. In the preferred embodiment of this invention illustrated herein, each second group of signal responsive means is provided by one transformer and the windings of such transformer are coupled together by the transformer core and coupled by an output winding in the transformer to provide a control signal for one of a plurality of system components, which are illustrated herein as thrusters in a thruster control system. Electrical signals are provided for each command condition to be imposed on the thruster, such as the total forward thrust required from a plurality of thrusters, and the electrical signal corresponding to the condition to be imposed on a particular first group of windings is conducted to that group. Thus, the output signals at each transformer are directly proportional to a respective system component's (i.e., a thruster in the example given) share of a desired command function, or plurality of such functions.

In the thruster control system disclosed herein utilizing this invention, four thrusters are illustrated each having 2° of freedom so that eight transformers are provided each with a winding corresponding to either the X degree of freedom of the thruster, or the Y degree of freedom of the thruster, a winding corresponding to the X or Y turning moment of the thruster, and an output winding. Also, as explained herein an additional bias winding may be provided in each transformer so that each transformer has a total of four windings. The transformers can be of conventional design with closely coupled windings. The four windings on each transformer have a common core and serve to couple the signals in each winding so that the output equations always satisfy the input conditions.

The equations to be satisfied are:

$$X = X1 + X2 + X3 + X4 \quad \text{(I)}$$

$$Y = Y1 + Y2 + Y3 + Y4 \quad \text{(II)}$$

$$M = X1 \cdot LY1 + X2 \cdot LY2 + X3 \cdot LY3 + X4 \cdot LY4 + \quad \text{(III)}$$
$$Y1 \cdot LX1 + Y2 \cdot LX2 + Y3 \cdot LX3 + Y4 \cdot L4 \cdot LX4$$

$$BX = BX1 - BX2 - BX3 + BX4 \text{ (bias command)} \quad \text{(IV)}$$

$$BY = BY1 + BY2 - BY3 - BY4 \text{ (bias command)} \quad \text{(V)}$$

where:

$X$ = commanded port-starboard motion of the vessel;
$Y$ = commanded fore-aft motion of the vessel;
$M$ = commanded turning moment;
$L$ = moment arm; and
$B$ = bias command.

In the electrical model representing these equations, one transformer would have windings represented by $X1$, $X1 \cdot LY1$, $BX1$, and an output winding; another transformer would have windings represented by $Y1$, $Y1 \cdot LX1$, $BY1$, and an output winding; etc. A straight series connection of $Y$ and $X$ translational windings into each $X$ and $Y$ bank of transformers ensures that equations (I) and (II) are always satisfied since the close coupling of each output winding to the input assures that the sum of the outputs will equal the $X$ or $Y$ inputs.

Similarly, series connection of the bias windings provides that the biasing of the outputs satisfies the input biasing equations (IV) and (V), even in the trivial case where BX and/or BY are equal to zero. If all the inputs are driven from low impedance voltage sources, the conditions of equations (I), (II), (III), (IV) and (V) can all be satisfied.

Each transformer includes a transformer core the flux level of which is to represent each separate degree of output freedom for the system. The variable of flux within the core is proportional to the amount of thrust for that particular degree of freedom. Likewise, a number of turns on this transformer core couple into this flux to give an output voltage proportional to the amount of thrust. The number of output turns is fixed for all thrusters in all degrees of freedom in the system (although differing numbers of turns may be used in systems with differing thruster power). Each of the transformer windings, when connected into an external circuit, imposes the winding voltages as a condition into the external circuit so that the separate windings allow inserting the same condition into multiple external circuits. The isolation of the separate windings on a core facilitate this connection into various external circuits. The core and its transformer action serve to make all the core's windings have an equal voltage (or a voltage adjusted by turns ratio), so that while each external circuit is yet independent it has in it the voltage induced by the flux in the core linked to the winding. The flux-winding voltage is reciprocal in that all windings are acted on by the flux to generate a voltage and any winding driven by a voltage may establish the flux level. The core and multiple coupled windings serve as a way to allow one variable to be entered in several simultaneous equations.

The moment windings can be added to the transformers with a number of turns proportional to each thruster's moment arm for that particular degree of freedom. With windings proportional to moment arm it can be seen that whatever voltage existed on the previously described X or Y translation winding must also be present on the moment windings except to have been multiplied by a turns ratio proportional to the thruster's moment arm in that degree of freedom. If all of the moment windings are connected in series with correct polarity then the output of the total series connected circuit is a measurement of the total moment produced by any and all translational thrusting taking place. This method of connection performs multiplication by turns ratio proportional to moment arm and summing to generate the total measured output voltage so that momenting commands are linearly weighted proportional to moment arm to the most remote thrusters. This linear weighting to the most remote thruster gives good efficiency and yet has each moment producing thruster participating in the moment command. Other schemes of moment producing command are, of course, permissible, and the net moments of any component can be directly measured.

Bias windings also can be added to the transformer similar to translational windings except that the sign is purposely reversed to create a bias. Also, pairs or other small groupings of units must be used to counteract each other. The purpose of these windings is to generate opposing thrust to utilize power to maintain a desired thruster load, to minimize non-linear behavior associated with thruster zero crossings, or to reduce reversing needs of an azimuthing thruster.

Other windings and groupings of special character may be added to the transformers to achieve special requirements; however, at the point where the number of imposed conditions equals the number of thruster degrees of freedom, no more conditions may be applied. When the number of conditions equals the number of thruster degrees of freedom, a unique solution exists and no further conditions can be applied.

Control overload can be provided whenever more conditions are being imposed than there are thruster degrees of freedom to carry out the commands, so that it is impossible for the system to carry out the input commands. In either case, the overload can be made self-diagnostic by monitoring the current in each control input circuit.

Power proportionality can be selected by use of a variable load resistor on the output winding of each degree of freedom transformer. With the same turns ratio from each X and Y input winding to the output windings, the load resistance can be made proportional to the input power.

DESCRIPTION OF THE DRAWINGS

In the drawings, wherein like reference numerals are used throughout to designate like parts, and wherein a preferred form of a thruster control system utilizing this invention is shown.

Figure 1:
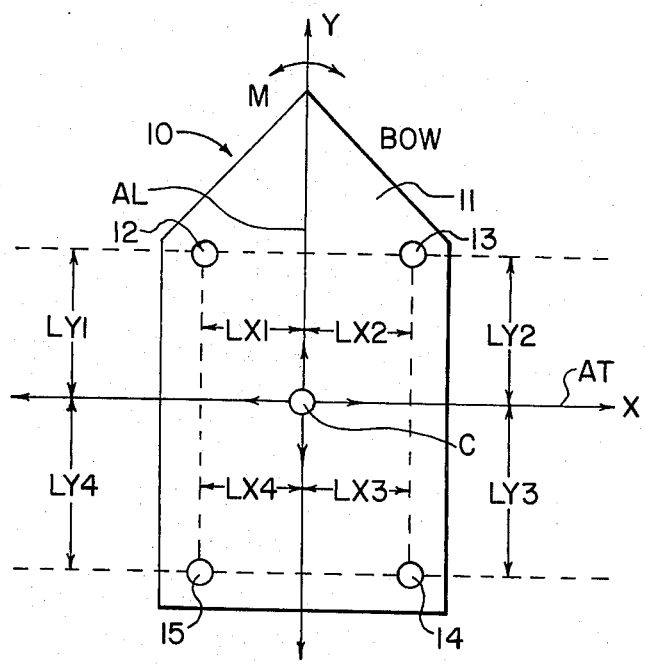
FIG. 1 is a schematic view of a vessel controlled by a plurality of thrusters, showing the various forces provided by the thrusters.

Referring to the drawings wherein a preferred form of apparatus is illustrated for solving simultaneous equations (I) – (V) above, and for illustrating the principles of this invention, in FIG. 1, a marine vessel 10, which may be a ship, drilling vessel or barge, is shown as including a hull 11 and four thrusters 12, 13, 14 and 15, located at the four corners of the vessel. As noted in FIG. 1, X represents movement of vessel 10 in the port-starboard direction, Y represents movement of vessel 10 in the fore-aft direction, and M represents the total turning force applied to the vessel. Also, the moment arms L for each of the thrusters in the X and Y directions is noted as being the distance between the respective thruster, and either the transverse axis AT or longitudinal axis AL passing through the center C of the vessel. For example, the moment arms provided thruster 12 during azimuthing of vessel 10 would be represented by LY1 and LX1, the moment arms provided thruster 13 would be LY2 and LX2, etc. Thus, with this arrangement, the simultaneous equations (I), (II), and (III), above, would represent steering and thrust commands to vessel 10 in the X and Y directions, and with the total moment force of M. The remaining description of the drawings herein relate to a thruster control system for controlling thrusters 12 – 15, and the degrees of freedom of these thrusters represented by their respective X, Y and M components, and by the application of certain internal constraints on the control system as set out herein.

Figure 2:
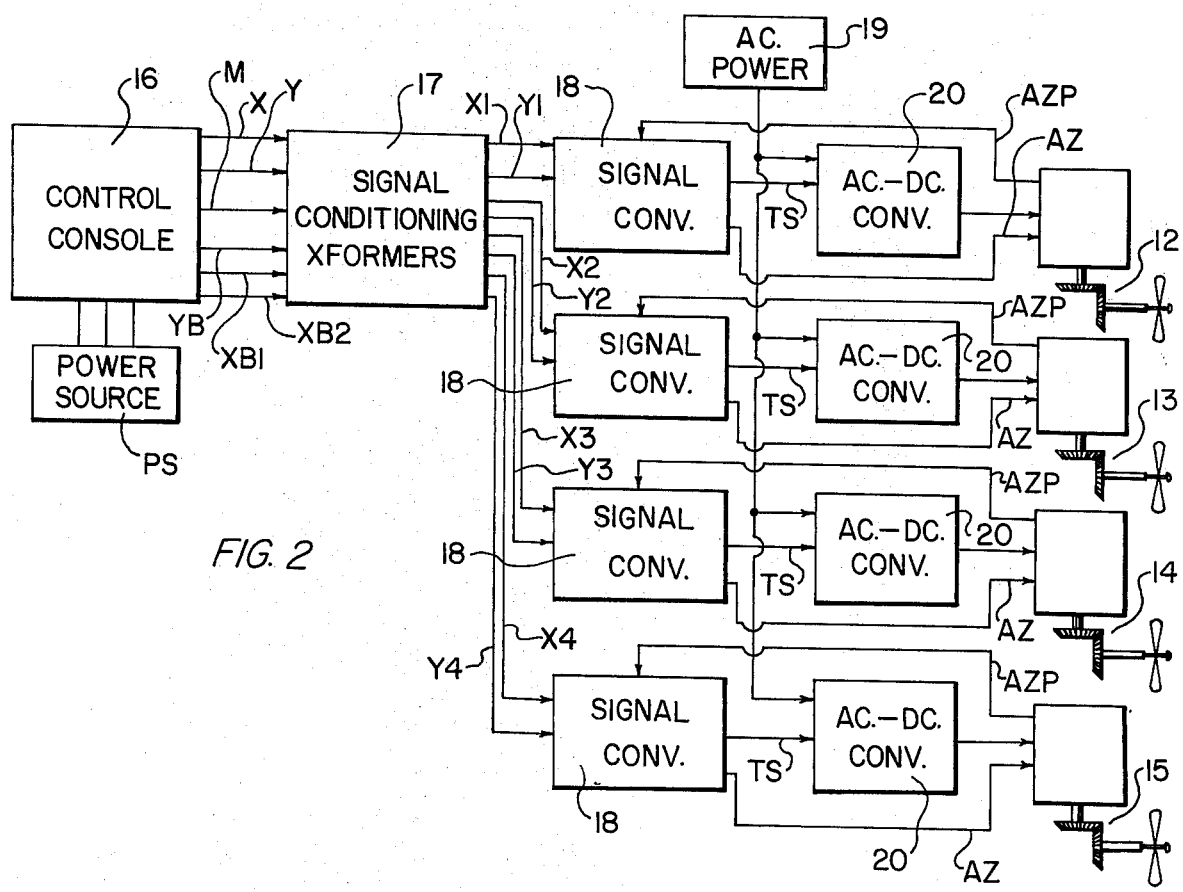
FIG. 2 is a block diagram of the thruster control system for controlling the movement of the vessel of FIG. 1.

FIG. 2 illustrates such a control system in which a plurality of command signals from a control console 16 are acted on to provide appropriate control signals to each of a plurality of the thrusters 12 – 15. Control console 16 may include a plurality of adjustable elements, such as adjustable auto transformers, shown in detail in FIG. 3, connected to a source of voltage PS to provide a plurality of electrical signals, each representing one of the commands or invariant conditions to be carried out by the thrusters. For control of vessel 10, these output signals would include an output signal X proportional in amplitude and direction to a desired movement of vessel 10 in the X direction, a signal Y proportional in amplitude and direction to desired movement of vessel 10 in the Y direction, a signal M proportional in amplitude and direction to the total turning moments to be applied to vessel 10, an output signal YB proportional in amplitude to the bias to be applied to the respective thrusters in the command Y direction of movement, an output signal XB1 proportional in amplitude to the amount of bias to be applied in the X direction for thrusters 12 and 13, and an output signal XB2 proportional in amplitude to the amount of bias to be applied in the X direction to thrusters 14 and 15.

The electrical signals from control console 16 are coupled into the input of a signal conditioning circuit 17, which responds to the input signals to provide output signals representing the solution of the simultaneous equations for each of thrusters 12 – 15. Circuit 17 preferably includes a plurality of signal conditioning means such as windings in a plurality of transformers, described in detail in FIGS. 3 and 4, and in the preferred embodiment described, a separate X transformer and separate Y transformer is provided for each of thrusters 12 – 15, for a total of 8 transformers. The X transformers have output signals X1 – X4 and the Y transformers have output signals Y1 – Y4, which signals define the component response of each thruster to a plurality of input commands from control console 16, such as represented by equations (I) – (V) above, and provide cartesian coordinate position signals for the respective thrusters. In the illustrated preferred embodiment of a thruster control system employing this invention, a signal converter 18 for each thruster is connected to each X and Y transformer representing one thruster for converting each of the X and Y position output signals for these transformers into a plurality of polar coordinate signals. One output of each converter 18 provides a signal TS which is proportional to the amount of thrust to be applied by the thruster controlled thereby, and signals TS thus serve as throttle signals. Another output of each converter 18 provides an output signal AZ which is proportional to the amount of azimuthing to be contributed by the thruster controlled thereby, and signals AZ serve as vessel azimuthing signals. A source of A.C. voltages 19 is connected to a plurality of A.C. to D.C. converters 20, each being provided for one of thrusters 12 – 15 to control the application of power to the drive motors in thrusters 12 – 15. Throttle signals TS are applied to an input of A.C. to D.C. converter 20 so that the drive signals to each thruster are directly proportional to the respective throttle signals TS. Also, azimuthing position signals AZP may be generated at each of the thrusters and conducted back to the control console for thruster azimuth position indicating and for other purposes as hereinafter described.

Figure 3:
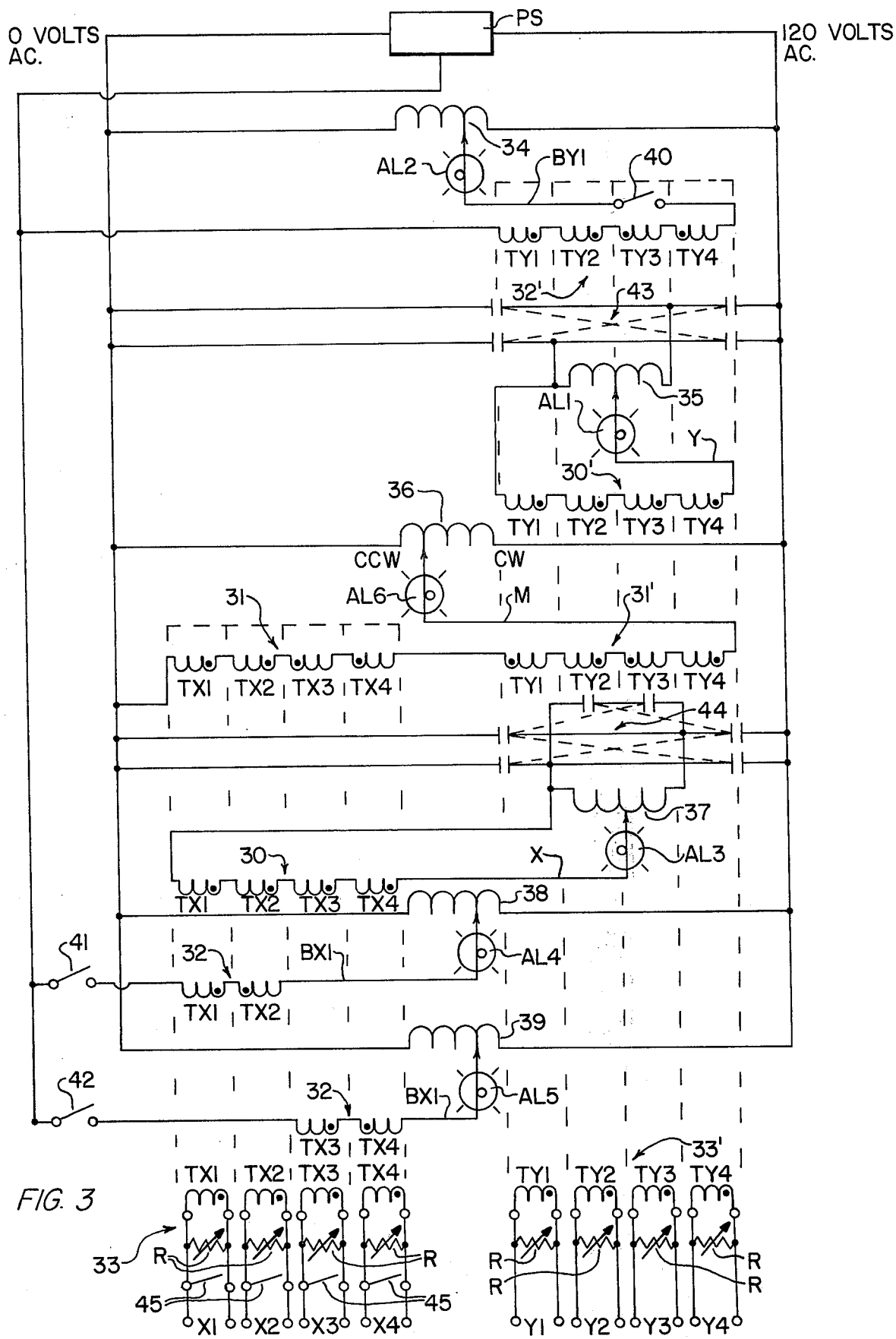
FIG. 3 is a detailed schematic diagram showing the connection of the multi-winding transformers to represent the simultaneous equations for the thrusters of FIG. 1.
Figure 4:
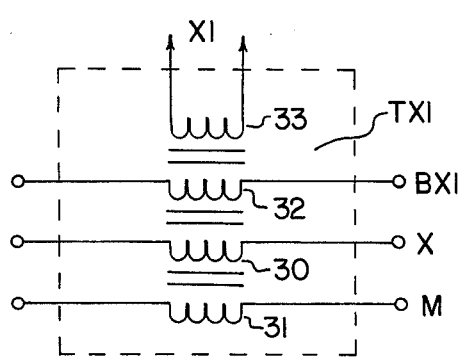
FIG. 4 is a schematic diagram of one of the transformers of FIG. 3.
Figure 6:
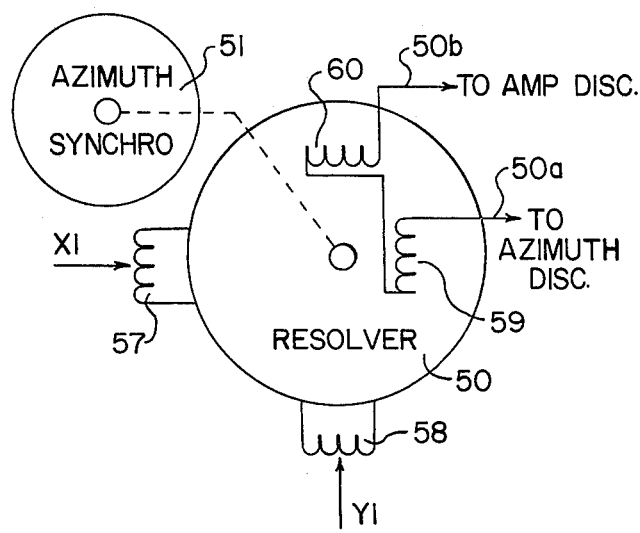
FIG. 6 is a schematic diagram of a signal resolver utilized in the apparatus of FIG. 5.
Figure 5:
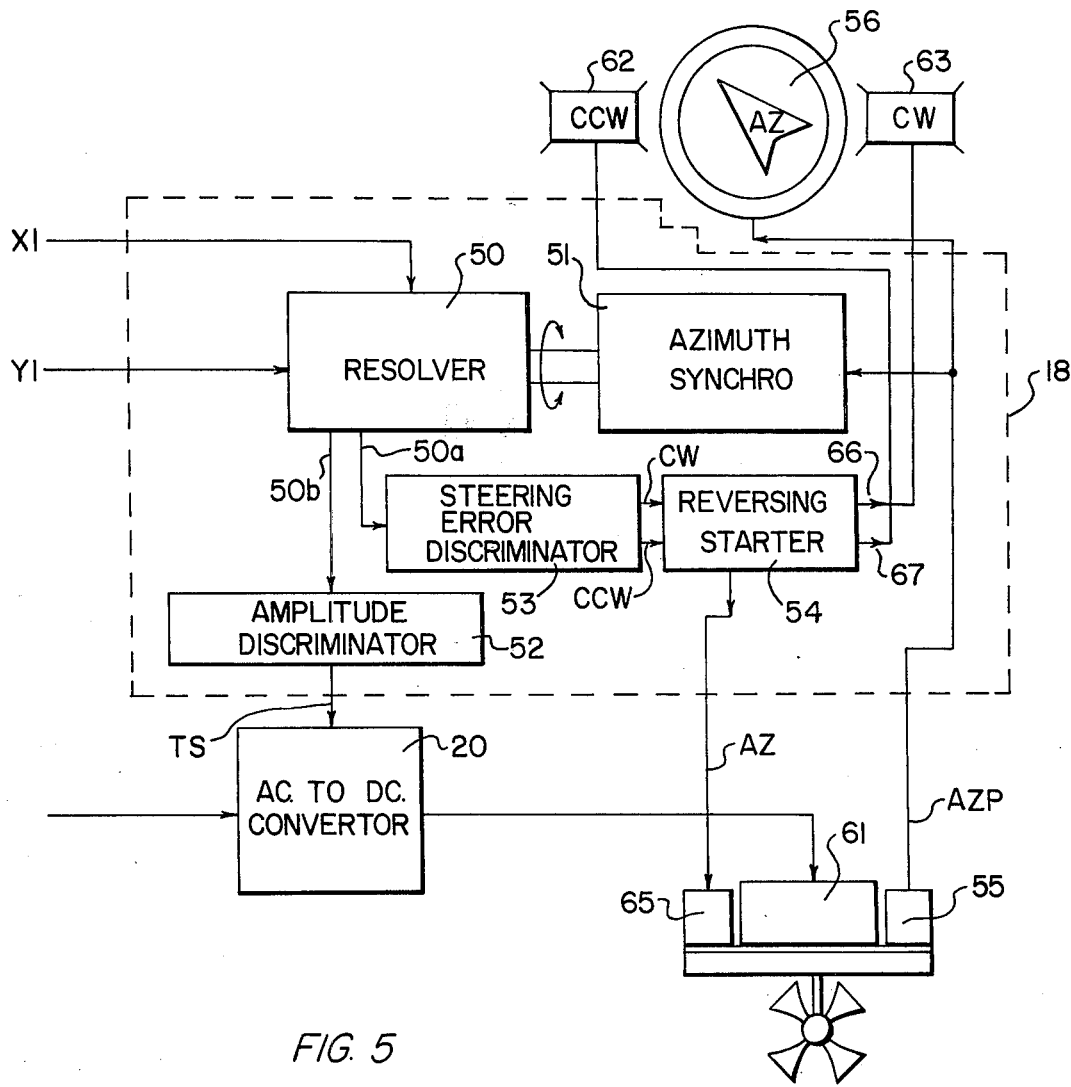
FIG. 5 is a detailed block diagram of the apparatus responding to the output of the transformers provided for one thruster to provide control signals for the thruster.

FIG. 3 illustrates details of control console 16 and circuit 17; FIG. 4 illustrates details of one of the transformers of circuit 17; and FIGS. 5 and 6 illustrate details of one of the signal converters 18 and thruster 12 to which it is connected. The description of FIGS. 4 – 6 to follow applies equally well to the specific apparatus of FIG. 2 for each of the remaining thrusters 13, 14 and 15.

In FIG. 4, a transformer TX1 is illustrated schematically by a dotted line box, and is representative of the X direction transformers of circuit 17. Transformer TX1 is adapted to translate command signals from console 16 into a composite command signal X1 for control of thruster 12. For this purpose, transformer TX1 includes an inductance or winding 30 adapted to be connected in series with similar windings of the other X direction transformers and between output terminals of console 16 providing command signal X to represent X1 in equation (I). Also, transformer TX1 includes a moment winding 31 adapted to be connected in series with the other moment windings of the X direction transformers and between output terminals of console 16 providing moment command signal M to represent X1·YL1 in equation (III). A bias winding 32 is also provided in transformer TX1 connected in series with the bias winding of the X transformer coupled to the other forward thruster 13, and to output terminals of console 16 providing command signal BX1 to represent BX1 in equation (IV). Transformer TX1 also includes an output winding 33 responsive to the signal conditions on the windings 30, 31 and 32 to provide the composite output signal X1. A similar illustration could be provided for the remaining X direction transformers which are designated TX2, TX3 and TX4 in FIG. 3, and also be provided for the Y direction transformers which are labeled TY1, TY2, TY3 and TY4 in FIG. 3, except in the latter case the windings of the transformers would be connected to terminals providing the Y direction command signals. For purposes of illustration in FIG. 3, where the series connected windings of the various transformers are illustrated to show interconnected groups of such windings, the reference numerals 31 – 33 are used as in FIG. 4 to illustrate the respective windings of the X transformers, and the reference numerals 31' – 33' are used to illustrate the respective windings of the Y transformers. Also, in FIG. 3, each winding is labeled (i.e., TX1 or TY1, etc.) to indicate which transformer of the group of transformers it belongs to, and a dotted line is drawn between windings of the same transformer.

Also, in FIG. 3, the phase or directions of current flow of signals in the respective windings are indicated by the solid dots associated with each winding so that signals on windings in which the dots are on the opposite side from each other are 180° out of phase. In FIG. 3, the transformer windings 30 and 30' of the respective transformers are all connected with their windings in the same direction. However, as hereafter explained, moment windings 31 and 31' and 32 and 32' are interconnected to impose signals of different phase on each other.

Also, a plurality of variable elements or throttles, such as variable auto transformers having a wiper arm, are connected across the output terminals of power supply PS so that the desired command signals, having a value between zero and the output voltage of power supply PS, for example 120 volts, are provided at the wiper arm of the respective control element. As illustrated in FIG. 3, auto transformer 34 provides a Y bias command signal BY1 on its wiper arm, auto transformer 35 provides the Y direction (fore-aft) throttle control signal Y on its wiper arm, auto transformer 36 provides the steering throttle or moment control signal M on its wiper arm, auto transformer 37 provides the X direction (port-starboard) command signal X on its wiper arm, auto transformer 38 provides the X direction bias command signal BX1 for the forward pair of the thrusters on its wiper arm, and auto transformer 39 provides the X bias command signal BX1 for the after pair of thrusters on its wiper arm. As illustrated, the wiper arms of the auto transformers are conducted to their respective groups of transformer windings. Thus, in response to any desired control of the thrusters 12 – 15, the described command signals can impose a voltage signal between zero and 120 volts on the various groups of windings of the various groups of transformers, each such voltage being proportional to the sum of the component parts of the control function to be provided by all of the thrusters. Coordinated control of all the thrusters of the system thus can be provided throughout a range of input conditions.

A plurality of control switches are also provided in series with the voltages to be applied to the various bias groups of windings in order to remove a particular bias command function from the system. As illustrated in FIG. 3, a switch 40 may be provided for removing the control voltage from bias windings 32', and switches 41 and 42 may be provided respectively for removing the control voltage from bias windings 32 controlling the X direction bias commands. Since the X, Y and M functions are necessary and essential and are always present (even at zero), these controls cannot be removed in toto from the system.

The bias throttles 34, 38 and 39 and the steering throttle 36, because of the manner in which the series windings controlled by them are connected across the output of voltage source PS, with series pairs of such windings bucking each other, are preferably stepless reversing controls so that the center portion of their respective wiper arms represents a zero command and full command in opposite directions are provided when the wiper arms are at the extreme ends of the auto transformers. X and Y direction throttles 35 and 37 are connected so that the center position of the wiper arm represents a command half-way between zero and full throttle in one direction.

Reversing switches, generally represented by numerals 43 and 44 may be provided for reversing the polarity of control signals to auto transformers 35 and 37 respectively and thus reverse the commanded X and Y directions.

Bias controls 34, 38 and 39 are normally not needed during operation of vessel 10, but are important in certain specialized cases. For this reason, these controls may be located below a locking panel on the control console of the vessel along with their on-off switches.

Fore-aft bias throttle 34 applies an adjustable bias in which the bias may, for example, be varied from 100 units with prop wash inwards, through zero, to 100 units with prop wash outwards. The fore-aft bias will azimuth the bow pair of thrusters 12 and 13 to be in opposition to the stern pair of thrusters 14 and 15. This thrust opposition will produce no net thrust yet may be very useful in a fore-aft maneuver where the bias would eliminate the need for thruster azimuthing to reverse thrust. Bias may also be used to load a vessel power generating plant to maintain a minimum "base load" or for testing or adjusting purposes. Port starboard bias may also be applied by bias throttle 38 to the forward pair of thrusters to divert their prop wash away from the after thrusters when under way. Bias does not restrict other maneuvers except by a reduction in available power.

The system described herein has 6° of freedom with all bias throttles 34, 38 and 39 engaged. However, some bias throttles must be turned off to operate vessel 10 with less than three thrusters and on-off switches 40, 41 and 42 in the bias throttle circuits provide this function. As noted, since control of X, Y and steering is fundamental and essential, no on-off switches are provided for these throttles.

Overload control of each of the groups of windings described may be provided by providing a current sensing device, such as a light or an alarm AL in series with the voltage applied to the windings so that when the current in the respective windings exceeds a predetermined amount indicating an input condition which exceeds the capability of the control system, the light or alarm will indicate the overload condition and indicate which of the respective group of windings is overloaded.

The six control overload indicators in FIG. 3 are as follows:
AL1 - Fore-aft or Y axis overload (fore-aft throttle 35)
AL2 - Fore-aft bias of Y bias overload (Y bias throttle 34)
AL3 - Port-starboard or X axis overload (port-starboard throttle 37)
AL4 - Forward-port-starboard bias overload (port-starboard bias throttle 38 for forward pair of thrusters 12 and 13)
AL5 - After port-starboard bias overload (port-starboard bias throttle 39 for after pair of thrusters 14 and 15)
AL6 - Steering overload (steering throttle 36)

As an example, if all thrusters are off, the advance of the fore-aft throttle 34, the corresponding overload AL1 for that throttle will illuminate. As another example, if the X bias throttle 38 is on when bow thruster 12 is off, the X bias overload AL4 will be illuminated because this requirement cannot be satisfied without the thruster 12. These overload lights are used to warn of approach to the control system limitations and through their self-diagnosis, point out corrective action required.

Also, connected across each of the X output windings 33 and each of the Y output windings 33' is a variable resistor R which functions as a percent power control which can be varied to vary the voltage at the output windings so that the proportion of power contributed by any one of the thrusters with respect to the other thrusters, in either the X or Y direction, can be varied as required. In addition, switches 45 may be provided across the outputs of windings 33 to automatically short out one or all of the windings when its respective variable resistor R is at zero setting and remove the effect of that winding and the thruster controlled by it from the control of the vessel. Thus, if the percent power control for a particular thruster is set at 100 percent, then that thruster is operated by the coordinated controls 33 and 37 as a thruster capable of nameplate power rating. If four thrusters are being operated with three set at a 100 percent power level and one set at 30 percent power level, then the coordinated control system operates as if it had three thrusters with 100 percent nameplate rating and one thruster with only 30 percent of nameplate horsepower rating. In this example of four thrusters, a simple full ahead throttle signal would take rated power out of the three thrusters set at 100 percent power and take only 30 percent power out of the thruster set at 30 percent power level.

Since the percent power control, when set at zero, takes a thruster out of coordinated control service by assigning zero power to it, the percent power level control limit switches 45 operate at the zero setting to provide signals for logic control which can be used in logic circuits (not shown) to verify that all thrusters are set to zero, which is necessary before certain command functions are initiated.

Normal operating setting for each percent power level control R is 100 percent. In operation, each operating thruster should have its percent power level control set to 100 percent as soon as it is ready. On the other hand, turning percent power level controls R will have no effect with all coordinated control throttles 35, 36 and 37 zeroed. After three of four thrusters are in service, adjustment of the percent level controls R can be used to warp the thrust response pattern of the coordinated control system for some specific objective such as reducing the demand on an overloaded thruster to re-allocate the power to some other thruster.

By way of example, if each resistor R is 1,000 ohms maximum, then a resistance of 1,000 ohms represents 100 percent power. This resistance is directly linearly proportional to the amount of power the control system will prorate to the thruster. For instance, suppose 1 ohm equals 2 horsepower, then at maximum the control system would treat the thruster as a 2,000 horsepower thruster. If the resistance is zero, then a zero horsepower thruster means the unit is off, or if the resistance is 300 ohms, a 600 horsepower thruster is provided. This is significant since the system will handle a thruster reduced to 600 horsepower correctly and proportionally share its load with a 2,000 horsepower thruster such that each are half loaded about the same time and each reaches full throttle at about the same time. As the percent power control is reduced to zero, the thruster controlled thereby is steplessly turned off, and as the throttle is turned towards 100 percent, the thruster controlled thereby is steplessly turned on.

Referring now to FIG. 5, a block diagram of a preferred form of circuitry for the control system of FIG. 2 is illustrated which responds to output signals X1 from TX1 transformer winding 33 and signal Y1 from TX1 transformer winding 33' to provide the drive and azimuthing signals TS and AZ for thruster 12. As noted, this circuitry is repeated for each of the thrusters 13 – 15 and for responding to each of the output signals X2, X3, X4, Y2, Y3 and Y4 from the remaining transformers. In FIG. 5, signal conversion circuit 18 previously described includes a resolver 50, an azimuth syncro 51, an amplitude discriminator circuit 52, a steering error discriminator circuit 53, and a reversing starter circuit 54. Signals X1 and Y1 are conducted to the input of resolver 50 which functions to convert these signals to polar coordinate signals for controlling the thruster. Resolver 50 is mechanically coupled to azimuth syncro 51, and one form of such a resolver is illustrated in FIG. 6. Azimuth syncro 51 is responsive to the orientation of thruster 12 and is connected to an azimuth feedback 55 for this purpose. Also, an azimuth position indicator 56 may be driven by a syncro 55 to provide an indication at a control console of the orientation of thruster 12.

Resolver 50 includes two outputs 50a and 50b, respectively, to provide for the generation of the steering or azimuthing signal AZ and the throttle signal TS for thruster 12. Signals X1 and Y1 are conducted from circuit 17 to stator input windings 57 and 58, respectively, of resolver 50, and an output rotor winding 59 provides an azimuth control signal at output 50a. Also, an output rotor winding 60 provides throttle control signals at an output 50b, and this signal is conducted to amplitude discriminator circuit 52 which detects the level of the signal on output 50b to provide a variable voltage signal TS to A.C. – D.C. converter 20, previously described. Output 50a of resolver 50 is conducted to steering error discriminator 53 which provides steering error signals for commanding either clockwise or counterclockwise direction of movement of thruster 12. If the signal at output 50a is greater than a certain value in one direction, discriminator 53 will provide an output signal of predetermined magnitude at a clockwise output CW, but if the signal at output 50a is greater than a predetermined amplitude in the other direction, a counterclockwise output CCW of discriminator 53 will provide a signal of predetermined magnitude. Outputs CW and CCW are conducted to reversing starter 54 which provides azimuth control signal AZ of proper polarity to control the operation and direction of orientation of azimuth motor 65. Reversing starter 54 may also include outputs 66 and 67 having signals thereon representing either clockwise motor-run direction, or a counterclockwise motor-run direction, which are conducted to lights 62 and 63 provided at a control console to indicate the direction that azimuth motor 65 is running.

Thus, with the arrangement described, resolver 50 converts the cartisian XY command signals X1 and Y1 in the example shown, into polar coordinate commands of thrust amplitude and azimuth direction. Winding 59 of resolver 50 may be a "sine" or azimuth error winding which generates a zero crossing polar sine wave output proportional to azimuth error, so that signal AZ causes thruster 12 to be driven in the correct direction to reduce the steering error signal on winding 59 to zero. Thus, the control system described operates the azimuth driver motor 65 as a servo to direct the thruster to the azimuth computed by a cartisian X–Y to polar coordinate conversion of resolver 50.

Winding 60 of resolver 50 is preferably a "cosine" or thrust amplitude having an output 90° out of phase with respect to the azimuth error signal. Since the azimuth error winding voltage 59 is reduced to zero by the operation of motor 65, the voltage on winding 59 represents the computed thrust magnitude from the X and Y cartisian thrust input valves. The output of thruster amplitude winding 60 is multiplied by the cosine of the azimuth error angle which would be 1.0 when the azimuth error angle is at zero degrees error. At 180 degrees azimuth error, this relationship would be a −1.0 and at any azimuth error greater than 90 percent, the output is negative. Since thruster driver motor 61 is only operated in one direction, negative outputs from winding 59 which indicate an azimuth error greater than 90° can be utilized to operate a slew relay (not shown) so that no thrust is applied while the thruster is in such a large azimuth error. As the thruster azimuth error becomes 90° or less, the computed amplitude at winding 60 is multiplied by the cosine of the azimuth error and the thrusters smoothly turns on reaching full value as the error becomes zero. This operation, of course, would apply to the application of thrust and azimuth signals to each of the thrusters 12 – 15.

From the above description, it should be apparent that a system and method is provided by this invention for automatically solving a plurality of simultaneous equations representing a plurality of input conditions to a system driving or controlling a plurality of system components or active devices, such as thrusters. The system of this invention can automatically compute the required contribution of any of the active devices in satisfying the set of input conditions in conjunction with response by the other active devices, and be utilized to provide control signals representing this share for controlling one or more actions by the active element. The apparatus for providing these functions as described herein in the example of this invention given is relatively simple, inexpensive and reliable, and can provide repeatable results despite a wide variation in input conditions.

Also, while the principles of the present invention are described herein as being applied to a thruster control system, they may be applied to many other applications requiring the solution of simultaneous equations and the specific apparatus used may take many different forms. Of course, thruster control systems utilizing the principles of the present invention can take many other forms other than described.

For example, while the principles of the present invention are illustrated by application to control of a vessel having 3 degrees of freedom, if the vessel had a fourth degree of freedom, such as the up and down motion of a submarine or a spacecraft, then an equation could be written representing this motion and an electrical model of this equation could be provided utilizing the principles of this invention.

Also, while the thruster system illustrated utilizes azimuthing thrusters, this invention may also apply to the control of other types of thrusters such as fixed thrusters, variable pitch thrusters, cycloidal thrusters, propeller thrusters, side wheel thrusters, omnidirectional or bidirectional thrusters, or any combination of such.

Although particular embodiments of the invention have been illustrated in the accompanying drawings and described in the foregoing description, it will be understood that the invention is not limited to the embodiments disclosed, but is capable of numerous rearrangements, modifications and substitutions of parts and elements without departing from the spirit of the invention.

What is claimed is:

1. An electrical model of a plurality of simultaneous equations representing the response of a dynamic system to a plurality of conditions, comprising, in combination:
    a source of electrical signals with each such signal representing one of said conditions;
    circuit means including a plurality of signal responsive means arranged in first groups of such means connected together so that each such first group represents one of said simultaneous equations, and in second groups of such means including such means from different first groups so that each such second group represents the response to be provided by a component of the system;
    means for conducting each of said electrical signals to one of the first group of said signal responsive means representing the simultaneous equation of the condition represented by such electrical signal; and
    means coupled to each second group of said signal responsive means for providing separate electrical output signals from each such second group.

2. The electrical model of claim 1 wherein said circuit means includes a plurality of multi-winding transformers with individual windings of said transformers providing said signal responsive means, and each of said transformers providing said second groups.

3. The electrical model of claim 2 wherein said system includes a plurality of active devices for providing the system components with each such device adapted to provide a component response to the total response of the system to said conditions, and wherein each of said transformers is connected to one of said active devices.

4. The electrical model of claim 3 wherein said system is a thruster control system for controlling motion of a vessel, and each of said active devices is a thruster.

5. The electrical model of claim 4 wherein each of said thrusters is an azimuthing thruster and said source of electrical signals provides a first electrical signal corresponding to the magnitude of movement of said vessel in a fore-aft direction, a second electrical signal corresponding to the magnitude of movement of the vessel in a port-starboard direction, and a third electrical signal corresponding to a turning movement of the vessel, and wherein said circuit means provide separate first groups of said windings for responding to each of said first, second, and third signals.

6. The electrical model of claim 5 wherein said source of electrical signals provides a fourth electrical signal corresponding to bias thrust to be applied by at least two of said thrusters, and said circuit means includes a separate first group of said windings for responding to said fourth electrical signals.

7. The electrical model of claim 1 wherein said system includes a plurality of active devices for providing the system components with each such device adapted to provide a component response to the total response of the system to said conditions.

8. The electrical model of claim 1 wherein each of said first groups is provided by a plurality of said signal responsive means connected in series.

9. An electrical model of a plurality of simultaneous equations comprising, in combination:
    a plurality of transformers at least equal in number to said equations, each transformer having a plurality of windings with a separate winding of each transformer provided for each different variable of the simultaneous equations, with windings of the respective transformers representing the same variable being coupled together to form a group of such windings representing one of said simultaneous equations, each of said transformers also including an output winding on which an inducted output voltage can be provided which is a function of the input voltages applied to the respective transformer;
    a source of a plurality of input electrical voltages with each such voltage representing an invariant condition to be solved by one of said simultaneous equations; and
    means for coupling each of said input voltages to the respective group of said windings to provide said output voltages.

10. The electrical model of claim 9 wherein the number of said transformers exceeds the number of simultaneous equations to permit multiple solutions of said simultaneous equations.

11. The electrical model of claim 9 wherein the number of said transformers equals the number of simultaneous equations to permit a single solution of said equations.

12. The electrical model of claim 9 further including means for providing an indication of an overload condition when the number of simultaneous equations imposed on the electrical model exceeds the number of said transformers.

13. The electrical model of claim 12 wherein said last mentioned means provides distinctive indication of any two of said equations which cannot be solved simultaneously.

14. The electrical model of claim 9 wherein each group of windings representing one of said simultaneous equations are connected in series with each other.

15. A thruster control system for controlling the application of power to a plurality of thrusters for controlling a vessel, comprising, in combination:
signal generating means for providing a plurality of electrical signals corresponding to input conditions for the thrusters; and
circuit means connected to respond to said electrical signals to automatically provide at least one control signal for controlling each thruster, each such control signal having a quality responsive to the component response to said input conditions to be provided by the thruster controlled by such electrical signal, said circuit means including a plurality of multi-winding transformers with each winding thereof connected to respond to one of said electrical signals, and each transformer coupled to one of said thrusters to provide one of said control signals.

16. The thruster control system of claim 15 wherein said signal generating means is adapted to generate a first electrical signal corresponding to fore-aft motion of the vessel, a second electrical signal corresponding to port-starboard motion of the vessel, and a third electrical signal corresponding to azimuthing of the thrusters, and said circuit means includes a fore-aft direction transformer for each thruster, and a port-starboard direction transformer for each thruster.

17. The thruster control system of claim 15 further including means responsive to said control signals to provide a signal proportional to the thrust to be provided by each thruster, and a signal proprotional to the azimuthing to be provided by each thruster.

18. The thruster control system of claim 15 wherein each of said transformers includes an output winding coupled to one of said thrusters, and further including variable resistance means connected across each output winding for varying the percent of rated power to be applied by the thruster coupled thereto.

19. A method of solving a plurality of simultaneous equations representing the response of a dynamic system having at least one system component to at least one invariant condition, comprising the steps of:
generating at least one electrical signal corresponding to each of said conditions;
dividing said electrical signal into component parts with each component part representing separate response by a system component to the invariant condition represented by such electrical signal; and
combining the component parts of said electrical signal representing the response of a system component to provide an electrical output signal corresponding to the component response to said condition to be provided by such system component.

20. The method of claim 19 wherein said system includes a plurality of system components adapted to respond to a plurality of invariant conditions, and wherein said dividing step includes passing each electrical signal to a plurality of series connected inductances.

21. The method of claim 19 wherein said dynamic system is a thruster control system for controlling motion of a vessel.

22. The method of claim 21 wherein said thruster control system includes a plurality of thrusters, and said simultaneous equations include an equation representing fore-aft motion of the vessel, an equation representing port-starboard motion of the vessel, and an equation representing azimuthing of the vessel.

23. The method of claim 22 wherein said thruster control system includes four thrusters.

24. The method of claim 22 wherein said simultaneous equations includes at least one equation representing a bias command to at least one of the thrusters.

25. The method of claim 23 wherein said simultaneous equations includes an equation representing a bias command to two opposed thrusters, and another bias equation to two other opposed thrusters.

26. Control apparatus for operating at least one thruster controlling the motion of a vessel, comprising, in combination:
signal generating means for providing a plurality of electrical signals each corresponding to a function of the thruster to be controlled; and
a plurality of inductance means each connected to be responsive to one of said electrical signals with one of said inductance means being provided for each thruster and each function thereof to be controlled, and all of said inductance means corresponding to a particular function being coupled together so that a coordinated control signal representative of each such function is provided to the thruster.

27. A marine vessel comprising, in combination:
at least one thruster for controlling at least two degrees of freedom of the vessel; and
a thruster control system for controlling each of the thrusters, said thruster control system including signal generating means for generating at least two electrical signals each corresponding to the total response of the vessel in one of said degrees of freedom, and circuit means connected to respond to each of said electrical signals to provide an electrical model of equations representing said degrees of freedom, said circuit means automatically generating coordinated control signals for causing each thruster of the vessel to provide its component response in each of said degrees of freedom.

28. The vessel of claim 27, including a plurality of azimuthing thrusters and wherein at least three degrees of freedom of the vessel is controlled.

29. The vessel of claim 28, wherein said circuit means includes a plurality of multi-winding transformers at least as great in number as said degrees of freedom.

30. The vessel of claim 28, including four thrusters and eight such transformers.

31. The vessel of claim 29, wherein the degrees of freedom to be controlled are the fore-aft motions of the vessel, the port-starboard motions of the vessel, and azimuthing of the vessel, and wherein two multi-winding transformers are provided for each thruster with one of said transformers being provided to provide a first output signal representing fore-aft response of its respective thruster, and the other of said transformers being provided to provide a second output signal representing port-starboard response of said thruster.

32. The vessel of claim 31, further including a plurality of signal converter means responsive to one of said first and one of said second output signals to provide a plurality of throttle signals each proportional in amplitude to the thrust to be provided by one of said thrusters, and a plurality of azimuthing signals each proportional to the azimuthing to be provided by one of said thrusters.

33. The vessel of claim 32 wherein each of said first and second output signals have values representing cartesian coordinate points for movement of the vessel, and each of said signal converter means converts such signal into signals having values representing polar coordinate points of movement of said vessel.

34. The vessel of claim 33 wherein each of said signal converters is a signal resolver responsive to azimuthing position of one of said thrusters.

* * * * *

UNITED STATES PATENT OFFICE
CERTIFICATE OF CORRECTION

PATENT NO. : 3,917,929
DATED : November 4, 1975
INVENTOR(S) : Tom R. Reinhart

It is certified that error appears in the above-identified patent and that said Letters Patent are hereby corrected as shown below:

In the Abstract, second paragraph, line 4,

"which" should be --such--.

Signed and Sealed this thirteenth Day of April 1976

[SEAL]

Attest:

RUTH C. MASON
*Attesting Officer*

C. MARSHALL DANN
*Commissioner of Patents and Trademarks*